US007204626B2

(12) United States Patent
Elwell

(10) Patent No.: US 7,204,626 B2
(45) Date of Patent: *Apr. 17, 2007

(54) LIGHTED VEHICLE GRILLE

(75) Inventor: James P. Elwell, Johnston, IA (US)

(73) Assignee: Putco, Inc., Story City, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/238,716

(22) Filed: Sep. 29, 2005

(65) Prior Publication Data
US 2006/0023464 A1 Feb. 2, 2006

Related U.S. Application Data

(62) Division of application No. 10/699,714, filed on Nov. 3, 2003, now Pat. No. 6,986,597.

(51) Int. Cl.
B60Q 1/28 (2006.01)
(52) U.S. Cl. .................. 362/496; 362/540; 362/545
(58) Field of Classification Search .................. 362/496
See application file for complete search history.

(56) References Cited

U.S. PATENT DOCUMENTS

| 4,791,402 | A | 12/1988 | Vaughn |
| 5,188,445 | A | 2/1993 | Haun et al. |
| 5,373,426 | A | 12/1994 | O'Sullivan |
| 5,798,691 | A | 8/1998 | Tim Kao |
| 6,190,026 | B1 | 2/2001 | Moore |
| 6,238,070 | B1 | 5/2001 | Galliner et al. |
| D466,453 | S | 12/2002 | Elwell et al. |

Primary Examiner—Ali Alavi
Assistant Examiner—Hargobind S. Sawhney
(74) Attorney, Agent, or Firm—McKee, Voorhees & Sease, P.L.C.

(57) ABSTRACT

A lighted vehicle grille includes a grille or grille insert mounted to the front of a vehicle with a plurality of lights mounted to the vehicle grille. The lights may be mounted within holes in the grille or may be otherwise attached to the grille. The lights are connectable to the electrical circuitry of the vehicle, and are adapted to turn on simultaneously with the selective turning on of other vehicle lights.

7 Claims, 3 Drawing Sheets

LIGHTED VEHICLE GRILLE

CROSS-REFERENCE TO RELATED APPLICATIONS

This application is a Divisional Application of U.S. Ser. No. 10/699,714 filed on Nov. 3, 2003 now U.S. Pat. No. 6,986,597, which is hereby incorporated by reference in its entirety.

BACKGROUND OF THE INVENTION

The present invention relates to a lighted vehicle grille.

Vehicle grilles have become highly decorative, and in some cases grille inserts have been provided which fit over the original grille and improve the decorative features of the original grille. It would be desirable to have either a grille or a grille insert that is capable of having lights mounted thereon.

Therefore a primary object of the present invention is the provision of a lighted vehicle grille.

A further object of the present invention is the provision of a grille insert which includes lights mounted thereon.

A further object of the present invention is the provision of a grille insert with lights mounted thereon that can be connected to the vehicle lighting system.

A further object of the present invention is the provision of a vehicle grille or grille insert that includes openings therein and includes lights mounted in the openings.

A further object of the present invention is the provision of a lighted vehicle grille which includes lights that turn on at the same time that either running lights, headlights, or turn lights are turned on.

A further object of the present invention is the provision of an improved lighted vehicle grille which utilizes LEDs or which can utilize other types of lights.

A further object of the present invention is the provision of an improved lighted vehicle grille that includes lights that are removable from the grille for replacement, or which can be added to the grille as desired.

A further object of the present invention is the provision of a lighted vehicle grille or grille insert that is economical to manufacture, durable in use, and efficient in operation.

BRIEF SUMMARY OF THE INVENTION

The foregoing objects may be achieved by a combination including a vehicle having a grille opening at the front thereof and having a light electrical circuit. A grill is mounted within the grill opening and the grill comprises a plate-like material having a front face, a rear face, and a plurality of grille holes therein. A grille light is mounted to the grille. The light may be connected to the electrical circuit of the vehicle and is capable of selective actuation to activate the light.

According to another feature of the present invention, the grille light is mounted within one of the grille holes.

According to another feature of the present invention, the grille light includes a threaded cylinder extending through the hole and protruding from the front and rear faces of the grille. A front nut is threaded over the cylinder protruding from the front face of the grille and a back nut is threaded over the cylinder protruding from the rear face of the grille.

According to another feature of the present invention, the nuts engage the front and rear faces of the grille to hold the threaded cylinder within the grille hole.

According to another feature of the present invention, the grille light includes wires extending from the rear surface of the grille for electrical connection into the light electrical circuit.

According to another feature of the present invention, the threaded cylinder surrounds one or more LEDs.

DETAILED DESCRIPTION OF THE PREFERRED EMBODIMENT

Figure 1:
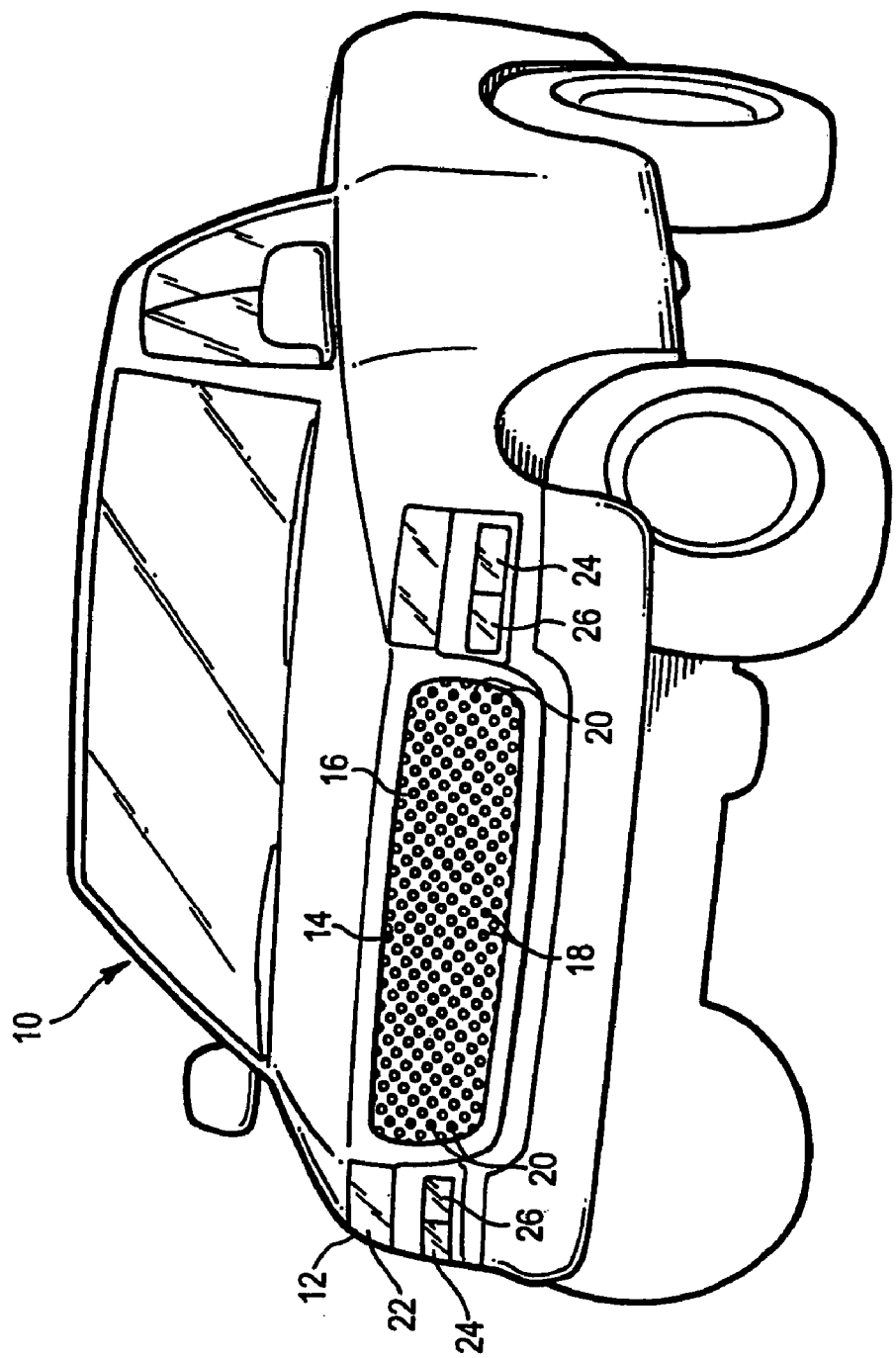
FIG. 1 is a perspective view of a vehicle having the present invention mounted thereon.

Referring to FIG. 1 the numeral 10 generally designates a vehicle having a vehicle front 12. In the vehicle front 12 is a grille opening 14 in which is mounted either a grille or a grille insert 16. The grille or grille insert 16 includes a plurality of grille holes 18 therein. While the grille holes 18 are shown in the drawings to be circular, they may also be of other shapes and configurations without detracting from the invention.

Within some of the grille holes 18 are mounted one or more grille lights 20. The grille lights 20 are shown adjacent the lateral edges of the grille insert 16, and this is the preferred configuration. However, other configurations of grille lights may be utilized without detracting from the invention.

The vehicle 10 also includes vehicle headlights 22 and vehicle turning lights 24 as well as vehicle running lights 26.

Figure 2A:
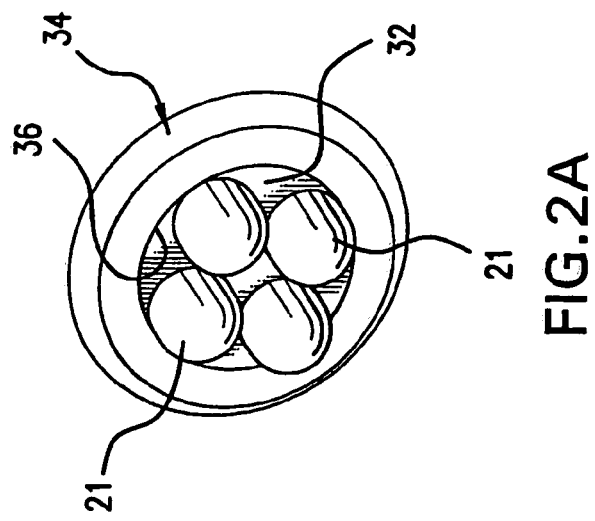
FIG. 2 is an enlarged front elevational view of the grille insert and the lights mounted in the holes thereof.
Figure 2:
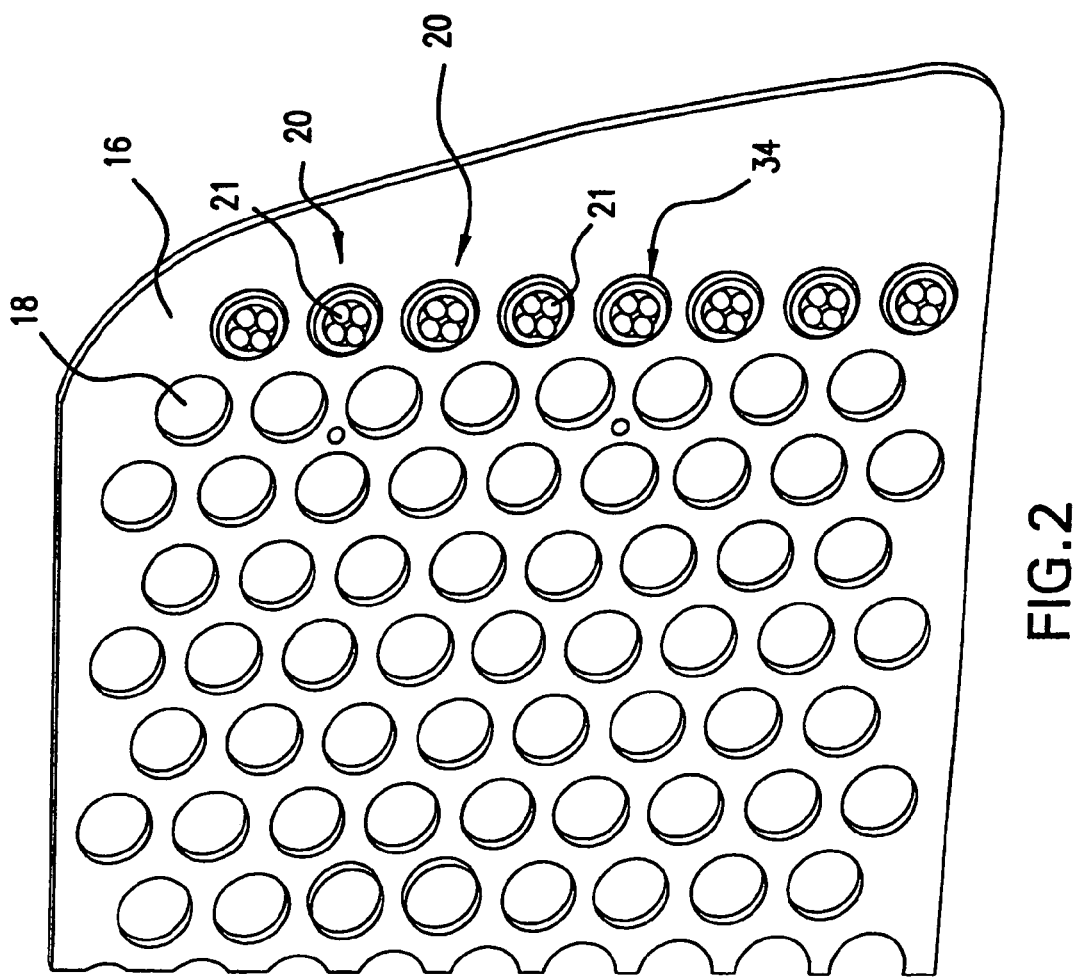
Figure 3:
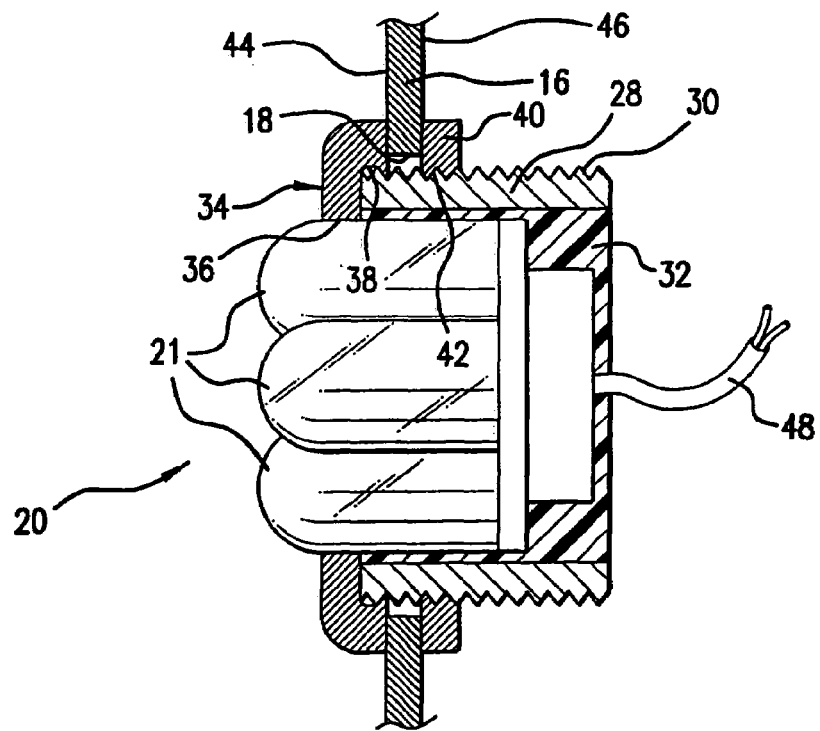
FIG. 3 is a sectional view taken along line 3—3 of FIG. 2.

Referring to FIGS. 2 and 3, each grille light 20 includes a plurality of LEDs 21. While LEDs 21 are shown in the preferred embodiment, other embodiments may include other types of lights that are electrically actuated without detracting from the invention. The LEDs 21 are mounted within a cylinder 28 having threads 30 on the outer cylindrical surface thereof. The cylinder 28 is hollow, and includes an epoxy or other moldable material 32 which attach the LEDs 21 within the cylinder 28.

A front nut 34 is threaded over the threads 30 on the outer surface of cylinder 28 at the front thereof and embraces and contacts the front face 44 of grille 16. Front nut 34 includes a circular opening 36 therein which surrounds the epoxy 36 and the LEDs 21 as shown in FIGS. 2 and 3. The front nut 34 includes internal front nut threads 38 which threadably engages the threads 30 of the front end of the cylinder 28.

A rear nut 40 includes rear nut threads 42 which threadably engage the threads 30 of cylinder 28 and which also engages the back surface or rear face 46 of grille 16. Thus front nut 34 and rear nut 40 embrace the grille or grille insert 16 therebetween and attach the grille light 20 to the grille 16.

Extending from the rear of the LEDs 21 are grille light wires 48. These grille light wires 48 are connected into the electrical system of the vehicle as shown by the schematic in FIG. 4.

Figure 4:
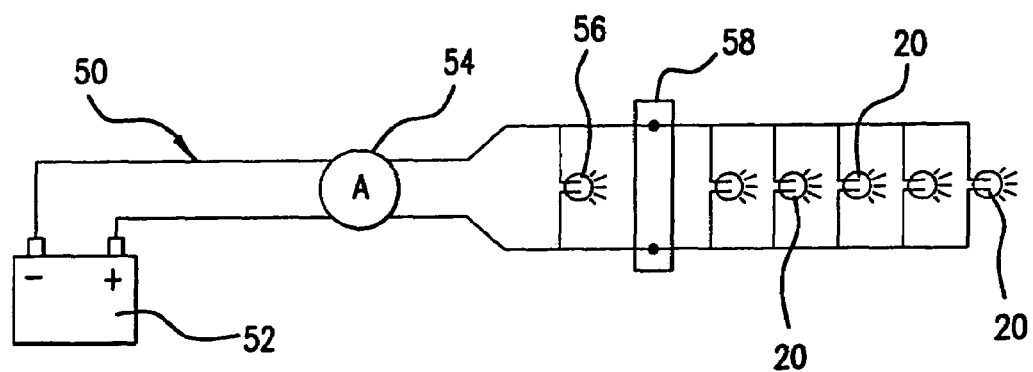
FIG. 4 is a schematic view of the electrical circuitry to which the grille light is connected.

In FIG. 4 is shown a vehicle light circuit 50 which includes a battery 52 and an alternator 54. Other electrical components may be included in this circuitry but these are shown for illustrative purposes. The vehicle light circuit 50 is connected to a vehicle light 56 which may be the turn signals 24 or the running lights 26 or the headlights 22.

A connector 58 connects the electrical circuit 50 to the plurality of grille lights 20. These grille lights 20 are connected to the vehicle light 56, and therefore can be made to be selectively actuated at the same time as vehicle light 56. It is possible to connect the grille lights 20 to the running lights 26, the turn signals 24, or the headlights 22. Vehicle light 56 represents any one of these three alternatives. It is also possible to connect the grille lights 20 directly to the battery 52 with a switch for independently turning on the grille lights 20.

While the vehicle lights 20 are shown to be LEDs 21, they can also be light bulbs of various shapes and sizes. Furthermore the configuration of the particular light 20 may be circular, or it may be other shapes or sizes depending upon the particular effect desired. The shape of the lights 20 may be circular, oblong, rectangular, square, or other configurations.

It is also possible to attach the lights 20 to the grille insert without inserting the lights into one of the holes 18. However it is preferred to mount the lights 20 within one of the holes 18 for the reason that it permits the wiring to lead out from the rear face of the vehicle grille.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A combination comprising:
   a vehicle having a grille opening at the front thereof and having a light electrical circuit;
   a grille mounted within the grille opening, the grille having a front face, a rear face, a first side, a second opposite side and a plurality of grille holes extending through the grille from the front face to the rear face;
   a first grille light extending partially into one of the grille holes of the grille with a portion of the grille light being visible from the front face of the grille, and with a portion of the grille light being behind the front face of the grille;
   securing mechanism for securing the grille light to the grille;
   both the grille light and the securing mechanism extending partially within the grille hole;
   the securing mechanism including a first member engaging the front face of the grille, a second member extending through the grille hole, and a third member engaging the rear face of the grille.

2. The combination of claim 1 wherein at least a second grille light extends partially within a second grille hole of the grille and a second securing mechanism secures the second grille light to the grille and partially within a second one of the holes of the grille.

3. The combination of claim 2 wherein the first and second opposite grille holes are located at both of the first and second opposite sides, the first grille light being partially within the first grille hole adjacent the first side of the grille and the second grille light being partially within the second grille hole at the second opposite side of the grille.

4. The combination of claim 1 wherein the second member is threaded and the first and third members threadably engage the threaded member.

5. A combination comprising:
   a vehicle having a grille opening at the front thereof and having a light electrical circuit;
   a grille mounted within the grille opening, the grille having a front face, a rear face, and a plurality of grille holes extending through the grille from the front face to the rear face;
   a grille light capable of actuation to create light connected to the light electrical circuit and extending partially into one of the grille holes of the grille with a portion of the grille light being visible in front of the front face of the grille, and with a portion of the grille light being behind the front face of the grille;
   securing mechanism extending partially within one of the holes of the grille in addition to the grille light for securing the grille light to the grille.

6. A combination comprising:
   a vehicle having a grille opening at the front thereof and having a light electrical circuit;
   a grille mounted within the grille opening, the grille having a front face, a rear face, a first side, a second side opposite from the first side, and a plurality of grille holes extending through the grille from the front face to the rear face;
   some of the plurality of grille holes being located adjacent the first side of the grille and other of the plurality of grille holes being adjacent the second side of the grille;
   a first grille light and a second grille light, each being connected to the light electrical circuit and each being capable of actuation to create light;
   the first grille light extending partially within a first one of the grille holes and the second grille light extending partially within a second one of the grille holes;
   a first securing mechanism extending partially within the first one of the grille holes in addition to the first grille light;
   a second securing mechanism extending partially within the second grille hole in addition to the second grille light.

7. The combination according to claim 6 wherein the first grille light is located adjacent the first side of the grille and the second grille light is located adjacent the second side of the grille.

* * * * *